(12) United States Patent
Yanagi

(10) Patent No.: US 7,331,438 B2
(45) Date of Patent: Feb. 19, 2008

(54) SOLENOID CLUTCH COUPLING

(75) Inventor: Junichiro Yanagi, Fujisawa (JP)

(73) Assignee: NOK Corporation, Tokyo (JP)

( * ) Notice: Subject to any disclaimer, the term of this patent is extended or adjusted under 35 U.S.C. 154(b) by 233 days.

(21) Appl. No.: 10/545,916

(22) PCT Filed: Mar. 5, 2004

(86) PCT No.: PCT/JP2004/002837

§ 371 (c)(1),
(2), (4) Date: Aug. 17, 2005

(87) PCT Pub. No.: WO2004/079219

PCT Pub. Date: Sep. 16, 2004

(65) Prior Publication Data

US 2006/0151277 A1  Jul. 13, 2006

(30) Foreign Application Priority Data

Mar. 7, 2003  (JP) .............................. 2003-060998

(51) Int. Cl.
*F16D 27/112* (2006.01)
(52) U.S. Cl. ........................ 192/84.941; 192/84.961; 192/200; 192/209; 192/30 V
(58) Field of Classification Search .......... 192/84.941, 192/55.3, 200, 209
See application file for complete search history.

(56) References Cited

U.S. PATENT DOCUMENTS

| 3,384,213 | A | | 5/1968 | Bernard et al. ................ 192/84 |
| 3,774,739 | A | | 11/1973 | Higuchi ....................... 192/84 |
| 4,624,354 | A | * | 11/1986 | Koitabashi ............. 192/84.941 |
| 5,195,625 | A | | 3/1993 | Chang et al. .................. 192/84 |

FOREIGN PATENT DOCUMENTS

| DE | 2216840 | 11/1972 |
| JP | 51-28527 | 7/1976 |
| JP | 52-34536 | 8/1977 |
| JP | 62-167936 | 10/1987 |
| JP | 2-58122 | 4/1990 |
| JP | 2-105617 | 8/1990 |
| JP | 6-6783 | 1/1994 |

* cited by examiner

*Primary Examiner*—Richard M Lorence
(74) *Attorney, Agent, or Firm*—Jacoson Holman PLLC

(57) ABSTRACT

To prevent coupling breakage between an elastic body and an outer ring due to friction heat of an armature and a rotor, an solenoid clutch coupling is provided with an elastic body (3) elastically coupling a hub (10) attached to a rotation shaft (6), and an outer ring (20) coupled to an armature (5) solenoidally moved close to and apart from a rotor (4), a sleeve (40) buried in an outer peripheral portion of the elastic body (30), a fit layer (32) constituted by a part of the elastic body (30) in an outer peripheral side of the sleeve (40) and attached to an inner peripheral surface of the outer ring (20), and non-cylindrical surfaces (21*a*) engaging with the fit layer (32) in a circumferential direction, and axial stoppers (23, 24) to an outer periphery of the elastic body (30) in a sleeve (21) of the outer ring (20).

4 Claims, 8 Drawing Sheets

US 7,331,438 B2

SOLENOID CLUTCH COUPLING

This is a nationalization of PCT/JP2004/002837 filed 5 Mar. 2004 and published in Japanese.

TECHNICAL FIELD

The present invention relates to a coupling provided in an solenoid clutch of a compressor, for example, in a vehicle cabin air conditioning apparatus of a vehicle.

BACKGROUND ART

In a refrigeration cycle of a vehicle cabin air conditioning apparatus of a vehicle, as a coupling provided in an solenoid clutch of a compressor compressing a refrigerant, there has been conventionally known a structure disclosed in Japanese Unexamined Utility Model Publication No. 62-167936, for example.

FIG. 8 is a cross sectional view showing an solenoid clutch using the same kind of coupling as described in the publication mentioned above by cutting along a plane passing through the axis of the solenoid clutch. In particular, as shown in FIG. 8, this kind of solenoid clutch 100 is provided with a non-rotation exciting coil 102 fixed to a housing 101, a rotor 104 arranged so as to surround the exciting coil 102, rotatably held to an axial hole tube portion 101a of the housing 101 via a bearing 103 and provided with a pulley 104a in the outer periphery, an armature 105 close to and facing to an end surface of the rotor 104, and a coupling 110 coupling the armature 105 to a rotation shaft 106 inserted to an axial hole tube portion 101a of the housing 101 so as to be movable in an axial direction.

The coupling 110 is provided with a hub 111 fitted by splines and fastened via a screw member 107 to the outer periphery of a leading end portion of the rotation shaft 106, an outer ring 112 coaxially arranged in the outer peripheral side of the hub 111, coupled to the armature 105 via a plurality of rivets 108 arranged in the circumferential direction and being a metal press formed product, and an elastic body 113 vulcanized and adhered to the opposing peripheral surfaces between the outer ring 112 and a rim portion of the hub 111 and made of an annular rubber-type elastic material.

In other words, the coupling 110 is structured such that when exciting the exciting coil 102 by energization, the coupling 110 allows the armature 105 magnetized by the exciting coil to move in an axial direction so as to be attracted to an end surface of the rotating rotor 104, on the basis of a shear deformation in an axial direction of the elastic body 113, reduces a noise at a time of the armature 105 and the rotor 104 being attracted, and transmits a torque to the rotation shaft 106 from the armature 105. Further, when the exciting coil 102 is not energized, the armature 105 is moved apart from an end surface of the rotor 104 with a slight gap G on the basis of a restoring force of the elastic body 113.

The solenoid clutch 100 generates a high heat on the basis of a friction only for a short time in the process that the armature 105 is attracted to the end surface of the rotating rotor 104. Further, in accordance with the conventional coupling 110, when the friction heat is transmitted to the outer ring 112 fastened to the armature 105, there is a risk that an adhesion portion of the elastic body 113 to the outer ring 112 is deteriorated and broken. Further, as a countermeasure thereof, there is employed a method of interposing a heat insulating spacer 109 made of a low thermal conductivity material around each of the rivets 108 and between a flange portion 112a of the outer ring 112 fastened by the rivet 108 and the armature 105, however, since an assembly becomes complicated and each of the rivets 108 still forms a heat transfer medium, it is hard to effectively prevent a heat transfer to the outer ring 112.

The present invention is made by taking the problem mentioned above into consideration, and a main technical object of the present invention is to prevent coupling breakage between an elastic body and an outer ring due to a friction heat generated by an armature and a rotor.

DISCLOSURE OF THE INVENTION

As a means for effectively achieving the technical object mentioned above, in accordance with a first aspect of the present invention, there is provided an solenoid clutch coupling comprising:

a hub attached to a rotation shaft;

an outer ring coupled to an armature coaxially arranged in an outer peripheral side of the hub and moved close to and apart from a rotor on the basis of an energization/deenergization of an exciting coil; and an elastic body elastically coupling the hub and the outer ring and made of a rubber elastic material, wherein a reinforcing ring is buried in an outer peripheral portion of the elastic body, and a fit layer constituted by a part of the elastic body formed in an outer peripheral side of the reinforcing ring is fitly attached to an inner peripheral surface of the outer ring.

In accordance with a second aspect of the present invention, there is provided an solenoid clutch coupling as recited in the first aspect, wherein non-cylindrical surfaces engaging with the fit layer in a circumferential direction are formed in an inner peripheral surface of the outer ring.

In accordance with a third aspect of the present invention, there is provided an solenoid clutch coupling as recited in the first aspect, wherein circumferential engagement portions engaging with parts of the outer ring in a circumferential direction are formed in the reinforcing ring.

In accordance with a fourth aspect of the present invention, there is provided an solenoid clutch coupling as recited in the first or second aspect, wherein axial stoppers with respect to an outer peripheral portion of the elastic body are formed in the outer ring.

BEST MODE FOR CARRYING OUT THE INVENTION

Figure 1:
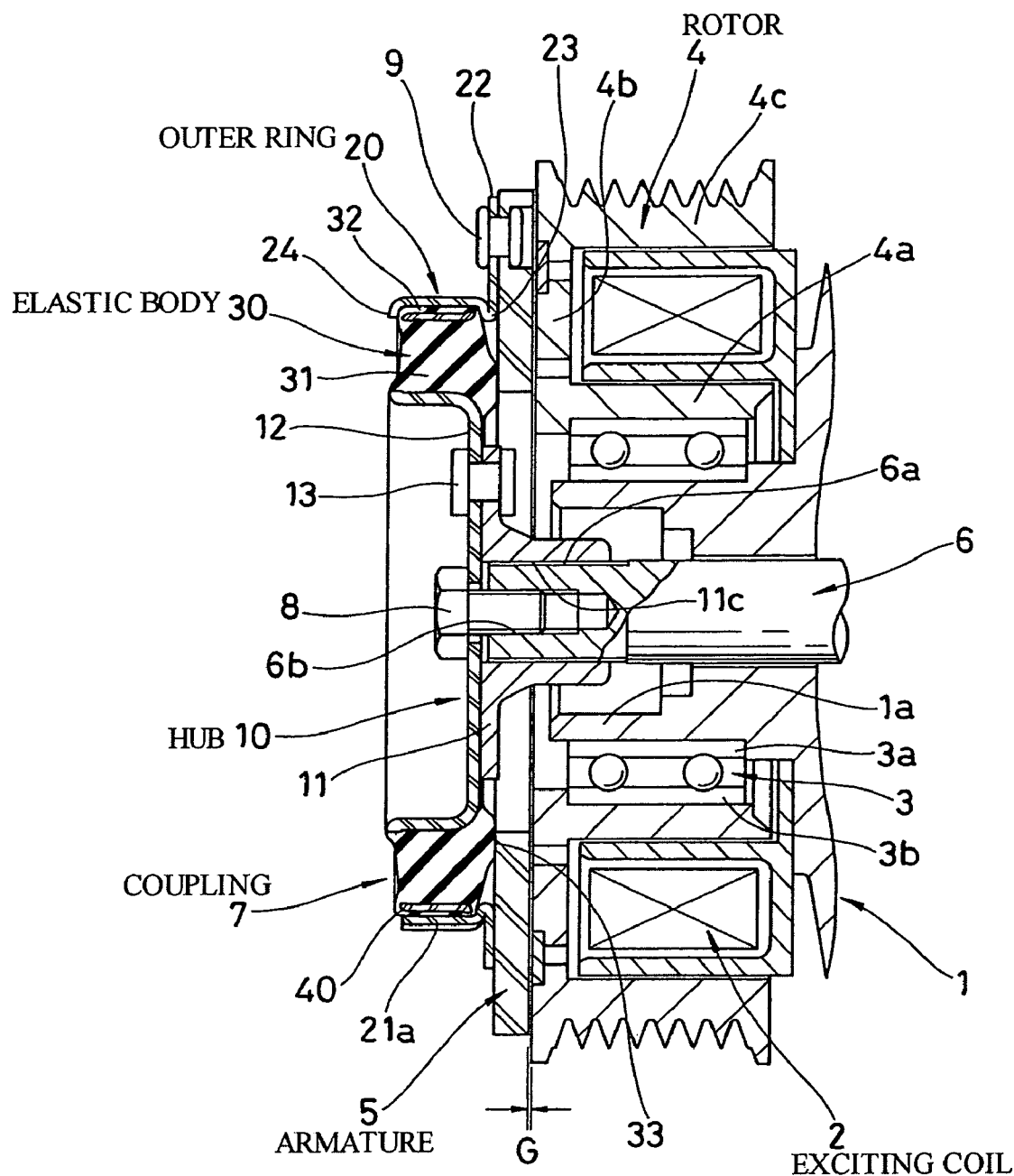
FIG. 1 is a cross sectional view showing a preferable first embodiment of an solenoid clutch coupling in accordance with the present invention by cutting along a plane passing through an axis in a state of being attached to an solenoid clutch.

In the following description, "front surface" or "front surface side" means the left side in FIG. 1, and "back surface" or "back surface side" means the right side in FIG. 1, that is, the side in which a compressor main body exists.

First, in FIG. 1, reference numeral 1 denotes a end portion in the front surface side of a compressor housing (hereinafter, refer simply to as a housing) in a vehicle cabin air conditioning apparatus of a vehicle, reference numeral 2 denotes a non-rotation exciting coil fixed to the housing 1, reference numeral 4 denotes a rotor rotatably held to the housing 1 via a ball bearing 3, reference numeral 5 denotes an armature serving as a clutch disc arranged so as to be close to and face to a front surface side of the rotor 4, reference numeral 6 denotes a rotation shaft inserted to the housing 1 and actuating a refrigerant compression mechanism (not shown) in an inner portion, and reference numeral 7 denotes a coupling in accordance with an embodiment of the present invention, which couples the armature 5 to the rotation shaft 6 in a movable state in the axial direction. The rotor 4 and the armature 5 are both made of a magnetic body metal which is magnetized by a magnetic field generated in the exciting coil 2.

A shaft hole tube 1a to which the rotation shaft 6 is inserted is formed in an end portion in the front surface side of the housing 1 so as to protrude, and an inner race 3a of the ball bearing 3 is fitly attached to an outer peripheral surface of the shaft hole tube portion 1a. Further, the rotor 4 has an inner peripheral tube portion 4a with an inner peripheral surface fitly attached to an outer race 3b of the ball bearing 3, an end wall portion 4b expanding in a disc shape from an end portion in a front surface side thereof between the exciting coil 2 and the armature 5, and a pulley portion 4c extending from an outer diameter end of the end wall portion 4b to a back surface side along an outer peripheral side of the exciting coil 2, that is, is formed in a cross sectional shape surrounding the exciting coil 2 in an approximately C shape. An endless belt (not shown) for inputting driving force from a crank pulley of an internal combustion engine is wound around the pulley portion 4c.

The coupling 7 is provided with a hub 10 attached to a shaft end in a front surface side of the rotation shaft 6, an outer ring 20 concentrically arranged in an outer peripheral side of the hub and attached to an outer peripheral portion of the armature 5, and an elastic body 30 elastically coupling the hub 10 and the outer ring 20.

Figure 3:
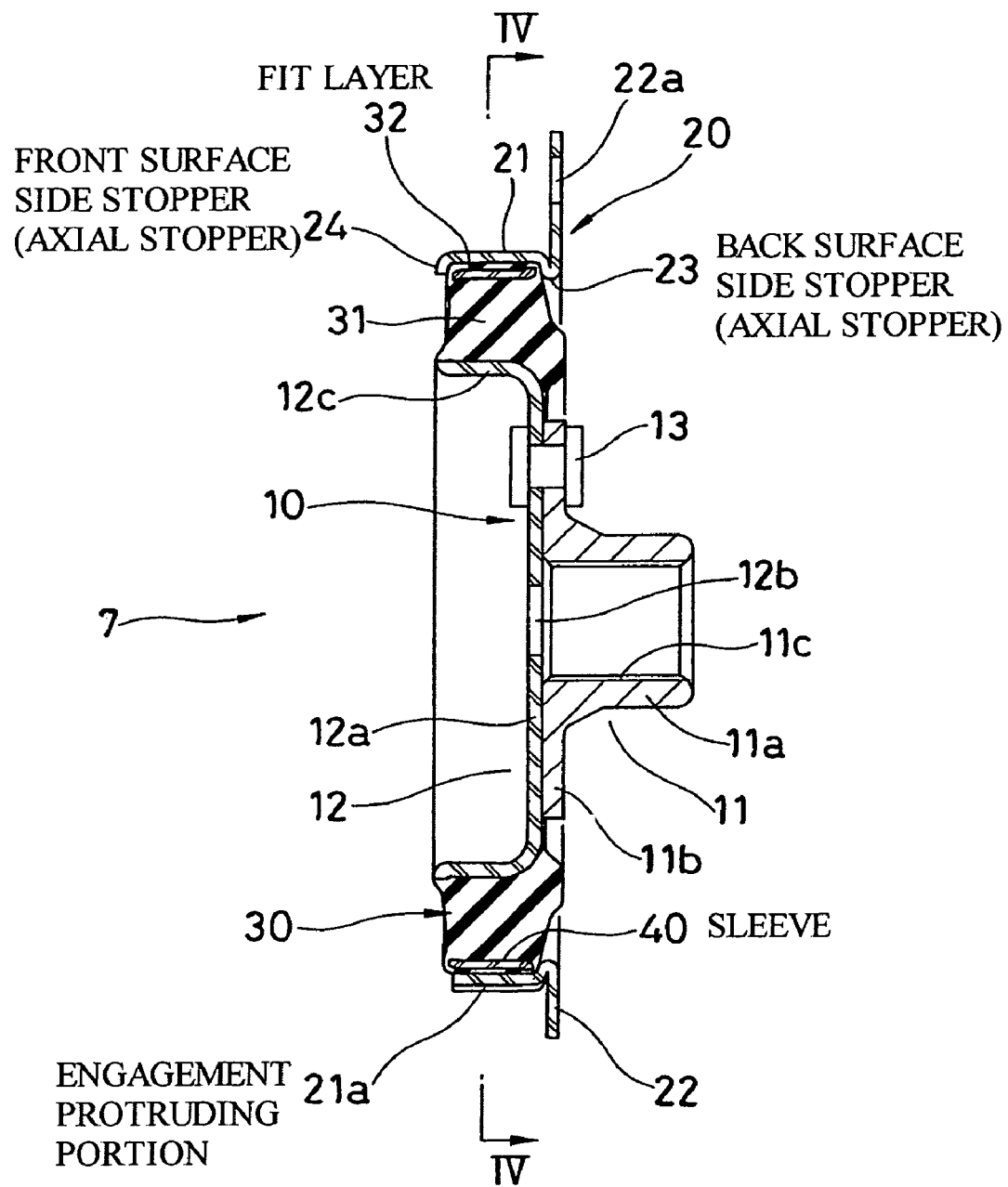
FIG. 3 is a cross sectional view showing by cutting a line III-III' in FIG. 2.

As shown in FIG. 3, the hub 10 is constituted by a boss 11 manufactured in accordance with a cold forging operation of a metal, and a plate 12 manufactured by press forming of a metal plate and concentrically coupled to a front surface side in an axial direction of the boss 11 by a plurality of rivets 13 in a circumferential direction.

The boss 11 in the hub 10 has a fit tube portion 11a in an inner periphery, and a disc-like flange 11b expanded perpendicularly to the axis from an end portion in a front surface side in an axial direction thereof toward an outer peripheral side. A spline hole 11c serving as an axial hole fitted by splines to an outer peripheral surface of a spline shaft portion 6a formed in an axial end of the rotation shaft 6 with a lot of axial grooves is formed through in an inner periphery of the fit tube portion 11a in an axial direction.

On the other hand, the plate 12 in the hub 10 is provided with a bolt insertion hole 12b having a smaller diameter than the spline hole 11c of the boss 11 in a center portion, and has a large-diameter disc portion 12a with an outer diameter larger than the flange 11b of the boss 11, and a rim portion 12c in a cylindrical shape formed by being bent to a front surface side from an outer peripheral end of the disc portion 12a. The rim portion 12c is positioned in a front surface side near an inner periphery of the armature 5, in an attached state in FIG. 1.

The hub 10 is attached to the rotation shaft 6 by inserting the spline shaft portion 6a of the rotation shaft 6 to the spline hole 11c of the fit tube portion 11a in the boss 11 so as to fit by the splines, and screwing an attaching bolt 8 inserted to the bolt insertion hole 12b of the plate 12 into a female screw hole 6b formed in an inner periphery of the spline shaft portion 6a so as to fasten an inner peripheral edge of the disc portion 12a of the plate 12.

The outer ring 20 is manufactured by press forming the metal plate, and has a sleeve portion 21 which is coaxial with the rim portion 12c in the plate 12 of the hub 10, a connecting flange portion 22 expanded from an end portion in a back surface side of the sleeve portion toward an outer peripheral side, and provided with a plurality of connecting holes 22a at a uniform interval in a circumferential direction, a back surface side stopper 23 bent in a state of protruding to an inner peripheral side between the connecting flange portion 22 and the sleeve portion 21, and a plurality of front surface side stoppers 24 formed in an end portion in a front surface side of the sleeve portion 21 at a uniform interval in a circumferential direction, and a plurality of engagement protruding portions 21a curved to an inner peripheral side at a uniform interval in a circumferential direction are formed in the sleeve portion 21. In this case, the back surface side stopper 23 and the front surface side stoppers 24 correspond to an axial stopper described in the fourth aspect of the present invention, and the engagement protruding portions 21a correspond to non-cylinder surfaces described in the second aspect of the present invention.

The outer ring 20 is connected to a front surface side near an outer periphery of the armature 5 via a plurality of rivets 9 inserted through the respective connecting holes of the connecting flange portion 22 and connecting holes provided in the armature 5 in correspondence thereto, as shown in FIG. 1.

The elastic body 30 is made of a rubber-type elastic material, an inner periphery of the elastic body 30 is integrally vulcanized and adhered to an outer peripheral surface of the rim portion 12c of the plate 12 in the hub 10, and a metal reinforcing ring 40 is integrally vulcanized and adhered to an outer peripheral portion in a buried state. Further, an inner peripheral side of the reinforcing ring 40 corresponds to an elastic body main body 31, and has a function of holding the armature 5 in a state of being apart from the end wall portion 4b of the rotor 4 to the front surface side in the axial direction by a gap G at a time of a deenergization of the exciting coil 2, and allowing the armature 5 magnetized by magnetic force to move in an axial direction so as to be attracted to the end wall portion 4b of the rotor 4 under rotation, so as to transfer a torque to the rotation shaft 6 side, at a time of an energization of the exciting coil 2. In this case, the reinforcing ring 40 can be made light by being made of a synthetic resin.

Figure 2:
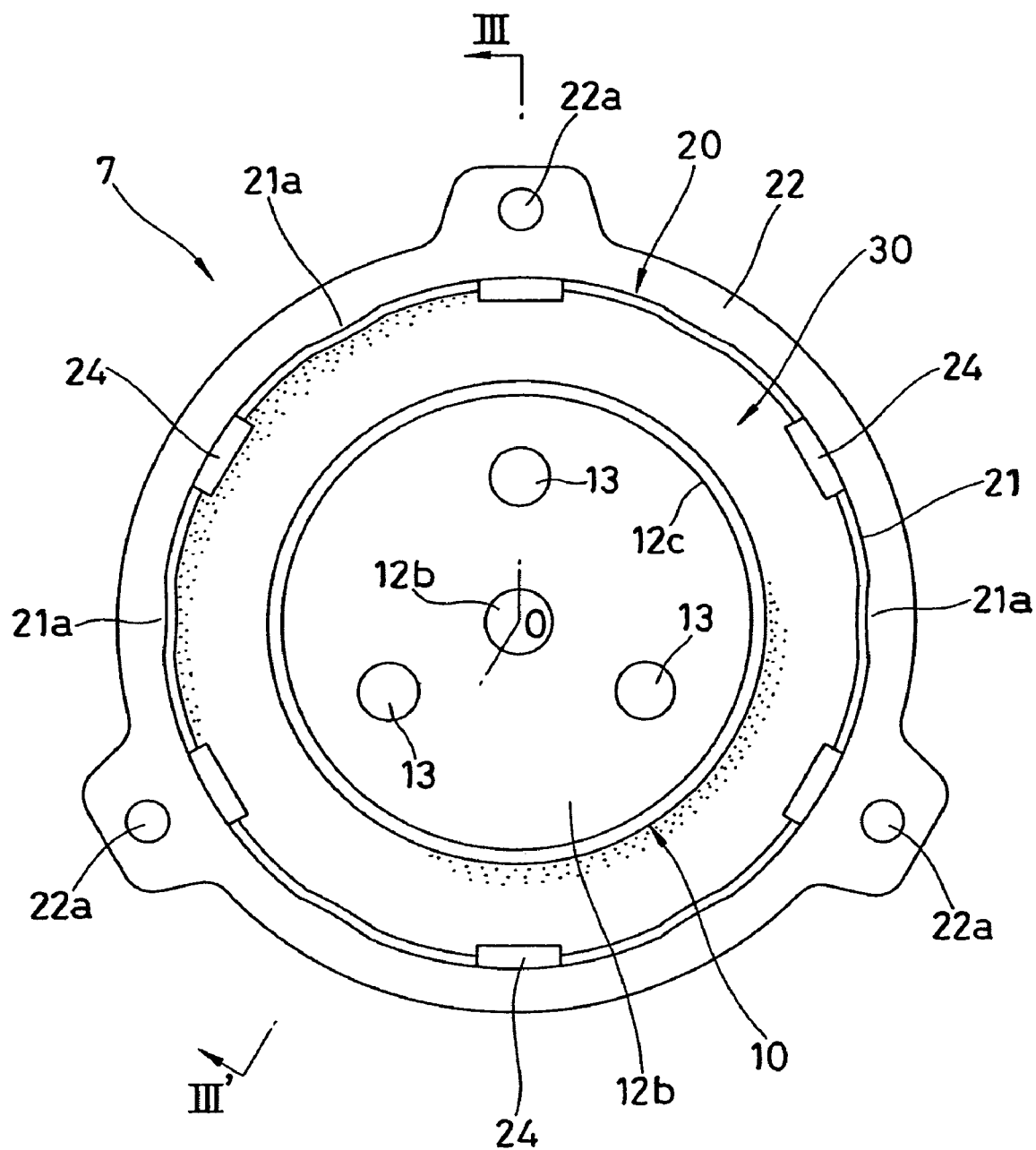
FIG. 2 is a front view showing the coupling in FIG. 1 in an uninstalled state.
Figure 4:
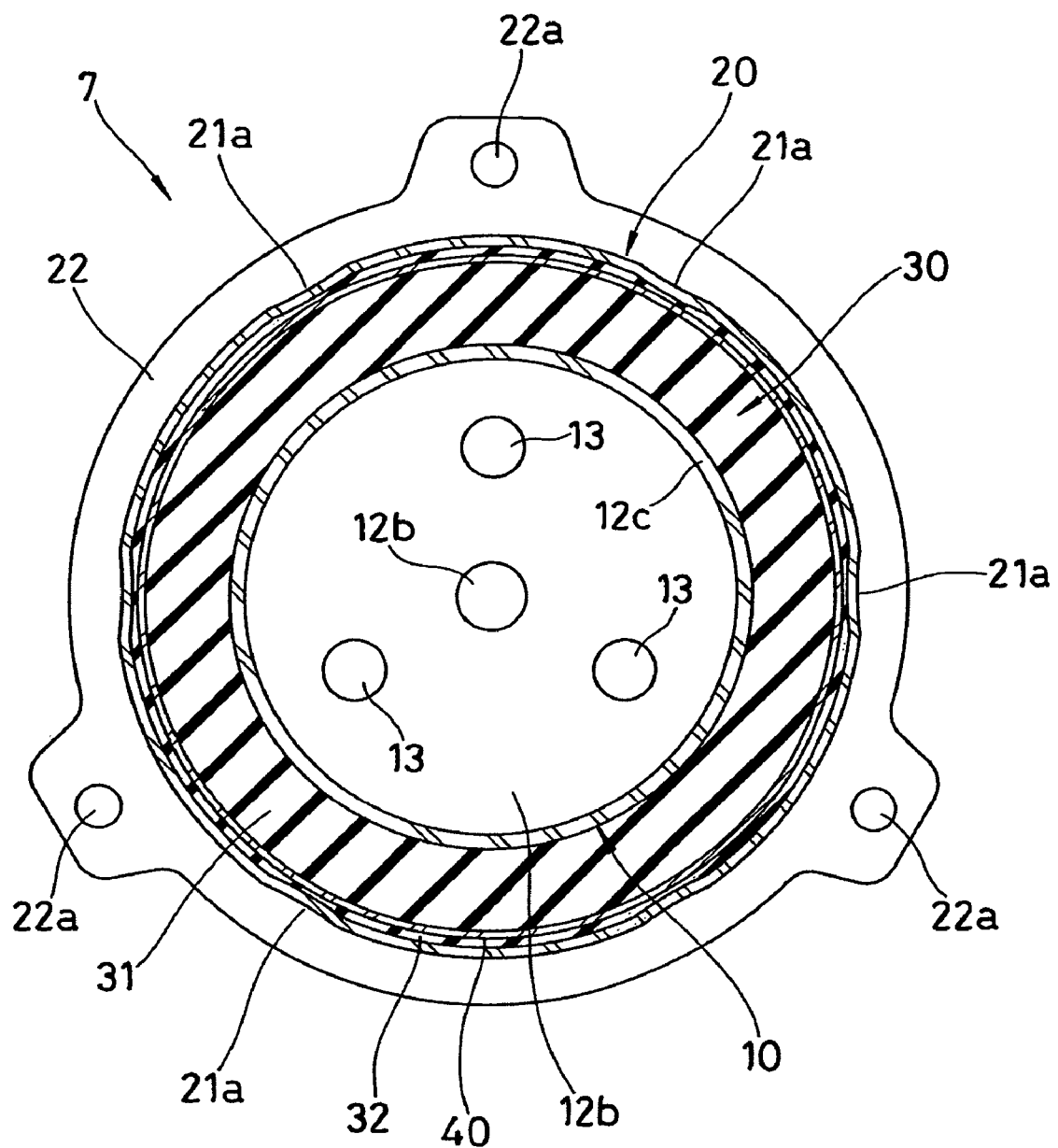
FIG. 4 is a cross sectional view showing by cutting along a line IV-IV' in FIG. 3.

A fit layer 32 in an outer peripheral side of the reinforcing ring 40 in the elastic body 30 is pressure inserted and fitted to the inner peripheral surface of the sleeve portion 21 of the outer ring 20 with a proper fastening margin with respect to the reinforcing ring 40, and a plurality of engagement protruding portions 21a formed in the sleeve portion 21 of the outer ring 20 are engaged in a concavo-convex manner with the fit layer 32 in a state of parts of the outer peripheral surface of the fit layer being depressed, as shown in FIGS. 2 and 4, whereby a relative rotation between the outer ring 20 and the elastic body 30 is inhibited. Further, an elastic protrusion 33, which is brought into contact with an end surface in the front surface side of the armature 5 at a time when the armature 5 is held at a position which is apart from the end wall portion 4b of the rotor 4 in an axial direction due to an elasticity of the elastic body main body 31, is formed in an inner peripheral portion of the elastic body main body 31.

Figure 5:
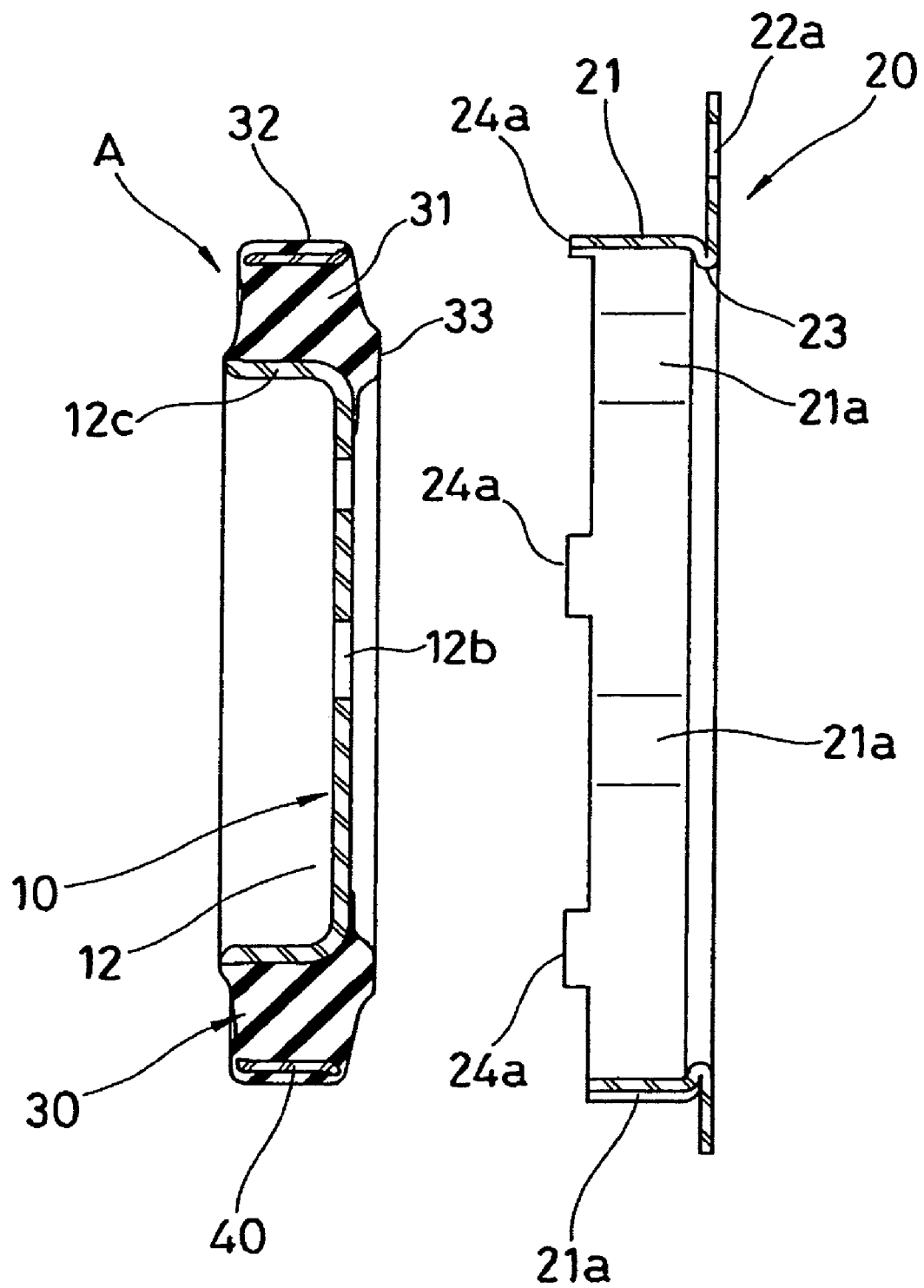
FIG. 5 is a cross sectional view showing an assembling process of an outer ring and an elastic body in the coupling in FIG. 1.

The elastic body 30 is manufactured as an integrally formed product A which is integrally formed with the plate 12 and the reinforcing ring 40 at the same time of the vulcanizing, as shown in FIG. 5, by mutually concentrically setting the plate 12 and the reinforcing ring 40, to which a vulcanizing adhesive agent is previously applied, within a metal mold (not shown) for vulcanizing, filling a unvulcanized rubber material for forming within an annular cavity defined from an outer periphery of the rim portion 12c of the plate 12 to an outer periphery of the reinforcing ring 40 in accordance with a mold clamping, and heat and pressurize the unvulcanized rubber material.

On the other hand, the outer ring 20 is formed such that an inner diameter of the sleeve portion 21 including the engagement protruding portions 21a is larger than a diameter of the reinforcing ring 40 in the integrally formed product A and smaller than an outer diameter of the fit layer 32, and, in an unassembled state shown in FIG. 5, a plurality of projections 24a protruding from the end portion in the front surface side of the sleeve portion 21 in the axial direction are formed at a uniform interval in a circumferential direction. Further, the coupling 7 in accordance with this embodiment is assembled by pressure inserting the integrally formed product A (the elastic body 30) to the inner periphery of the sleeve portion 21 from the front surface side, bringing the end portion in the back surface side in the outer peripheral portion of the elastic body 30 into contact with the back surface side stopper 23, bending the projections 24a to an inner peripheral side so as to form a front surface side stoppers brought into contact with the end portion in the front surface side in the outer peripheral portion of the elastic body 30, and attaching the boss 11 to the plate 12 of the integrally formed product A via the rivets 13, as shown in FIG. 3.

A description will be given below of an operation of the solenoid clutch using the coupling 7 in accordance with the first embodiment mentioned above. In FIG. 1, the rotor 4 rotates on the basis of driving force applied from a crank pulley of an internal combustion engine, via an endless belt (not shown) wound around the pulley 4c. Further, since the armature 5 is held in a state of being apart from the end wall portion 4b of the rotor 4 via a gap G at a time of the deenergization of the exciting coil 2, the torque to be applied to the rotation shaft 6 is shut off, that is, a compressor (an air conditioning apparatus) is in a stop state.

In this case, if an exciting current is supplied to the exciting coil 2, the rotor 4 and the armature 5 are magnetized by a magnetic field generated around the exciting coil 2. Accordingly, the armature 5 is displaced in an axial direction toward the rotor 4 while accompanying a shear deformation in the axial direction of the elastic body main body 31 of the elastic body 30 in the coupling 7, and is adhered to the end wall portion 4b thereof so as to be in a clutch meet state. Accordingly, a rotation torque of the rotor 4 is transferred to the rotation shaft 6 from the armature 5 via the outer ring 20 of the coupling 7, the elastic body 30 and the hub 10, whereby the compressor (the air conditioning apparatus) becomes in an operational state.

At this time, the elastic body 30 reduces an interaction sound on the basis of the clutch meet between the armature 5 and the rotor 4, and effectively reduces an impact generated by the rotation torque of the rotor 4 rapidly input to the armature 5 on the basis of the clutch meet, in accordance with the shear deformation in a torsional direction of the elastic body main body 31. Further, since the elastic body 30 is structured such that the fit layer 32 in the outer peripheral portion is brought into pressure contact with the sleeve portion 21 of the outer ring 20, and is engaged in a concavo-convex manner with the engagement protruding portions 21a formed in the sleeve portion 21, a slip in a circumferential direction is not caused between the outer ring 20 and the elastic body 30 due to the rapid rotation torque input to the outer ring 20 from the armature 5, and a slip in an axial direction of the elastic body 30 with respect to the outer ring 20 is prevented by the back surface side stopper 23 and the front surface side stoppers 24 formed in the sleeve portion 21.

Further, since the armature 5 slides with the rotor 4 only for a short time in the process that the armature 5 is attracted to the end wall portion 4b of the rotor 4 and the clutch meet is performed, a high heat is generated by friction. Further, the heat is transferred to the sleeve portion 21 from the connecting flange portion 22 of the outer ring 20. However, since the fit layer 32 brought into pressure contact with the inner peripheral surface of the sleeve portion 21 is constituted by a nonconductor and a coefficient of thermal conductivity is extremely low, the reinforcing ring 40 and the elastic body main body 31 are thermally insulated with respect to the outer ring 20. Accordingly, it is possible to effectively prevent the adhered surfaces between the reinforcing ring 40 and the elastic body main body 31 from being broken, without interposing the heat shielding spacer between the armature 5 and the outer ring 20.

In this case, in the outer peripheral portion of the fit layer 32 brought into pressure contact with the inner peripheral surface of the sleeve portion 21 in the outer ring 20, a rubber material may be deteriorated due to the heat. However, since slip torque between the fit layer 32 and the sleeve portion 21 does not depend on the adhesion, but depends on concavo-convex engaging force with respect to the engagement protruding portions 21a formed in the sleeve portion 21, a torque transfer function is secured.

Next, if the supply of the exciting current to the exciting coil 2 is shut off from the clutch meet state in which the armature 5 is attached to the rotor 4, magnetic attraction force of the armature 5 is cancelled. Accordingly, the armature 5 moves apart from the end wall portion 4b of the rotor 4 so as to return to the front surface side on the basis of a restoring force in the axial direction of the elastic body main body 31. Accordingly, the transfer of the rotation torque from the rotor 4 via the armature 5 and the coupling 7 is shut off, and the rotation of the rotation shaft 6 is stopped.

Further, at a time of the returning motion of the armature 5, since the structure is made such that the end surface in the front surface side thereof is brought into contact with a plurality of circular arc-shaped elastic protrusions 33 formed in the inner peripheral portion of the elastic body 30, thereby regulating the returning position of the armature 5, the collision sound as in the case of the metal contact is not generated.

In this case, in the embodiment mentioned above, the non-cylindrical surfaces formed in the sleeve portion 21 of the outer ring 20 are constituted by a plurality of engagement protruding portions 21a having the curved shape to the inner peripheral side, however, various shapes such as a V shape, a wavy shape and the like can be considered.

Figure 6:
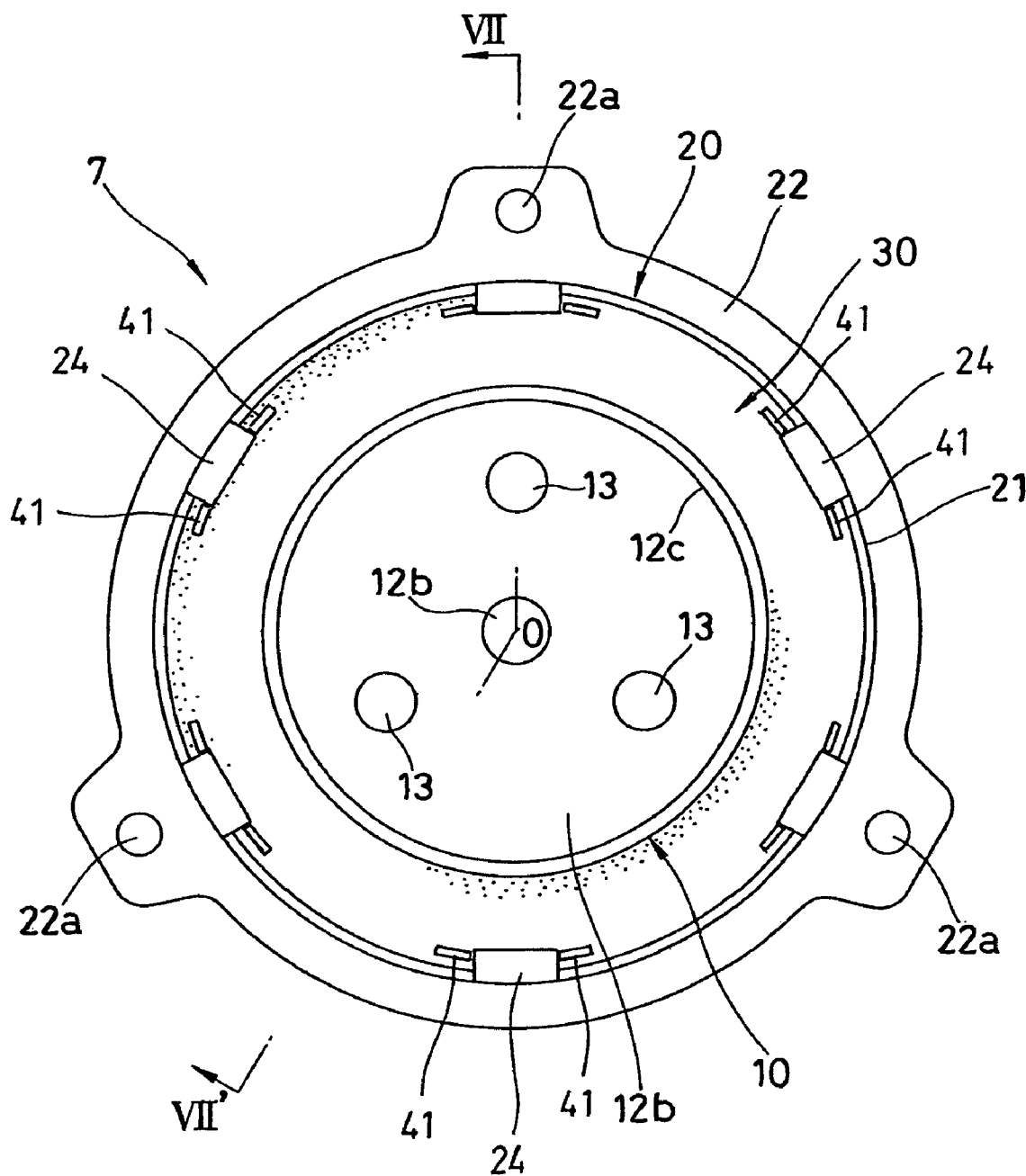
FIG. 6 is a front view showing a preferable second embodiment of the solenoid clutch coupling in accordance with the present invention in an uninstalled state.
Figure 7:
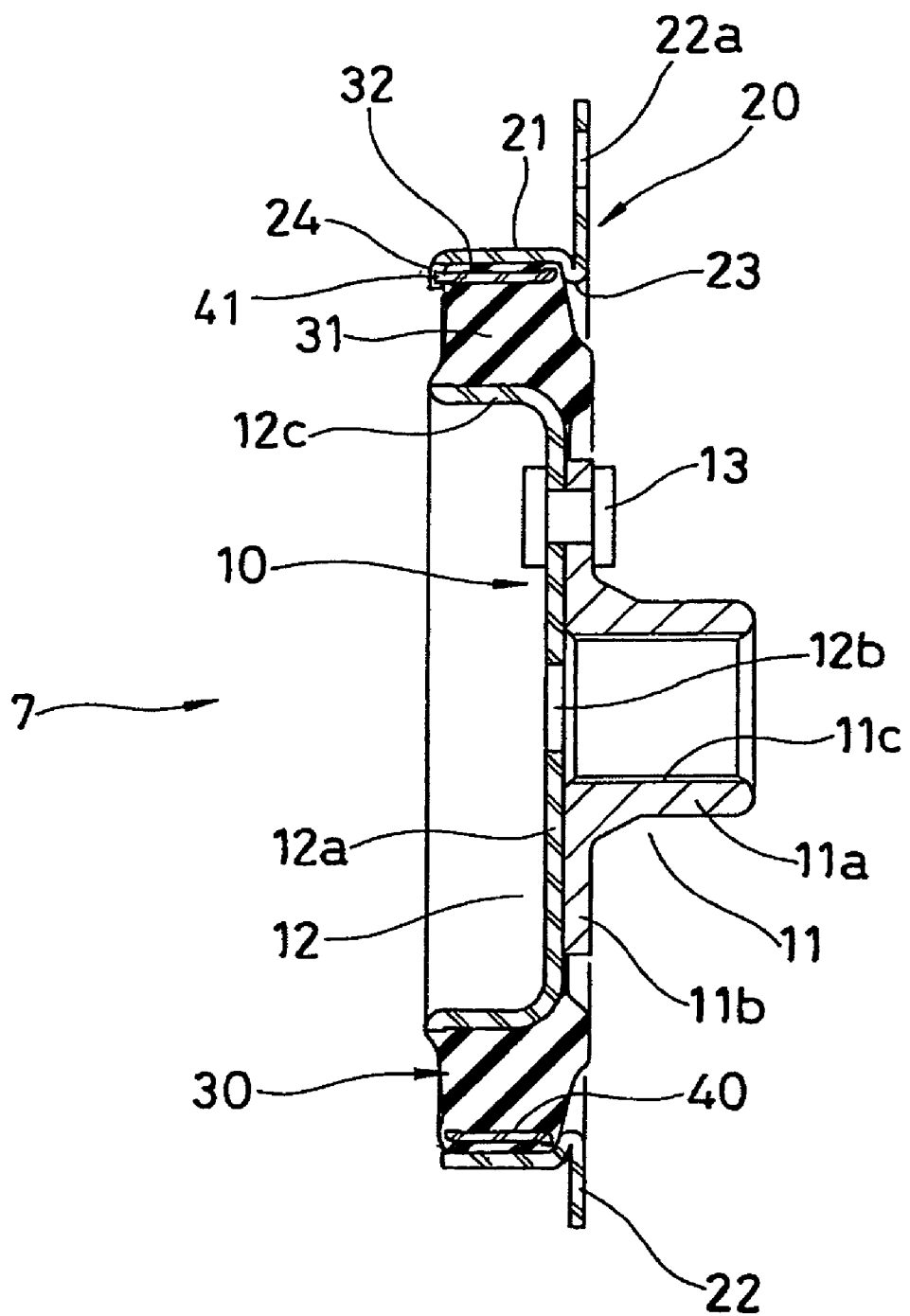
FIG. 7 is a cross sectional view showing by cutting along a line VII-VII' in FIG. 6.
Figure 8:
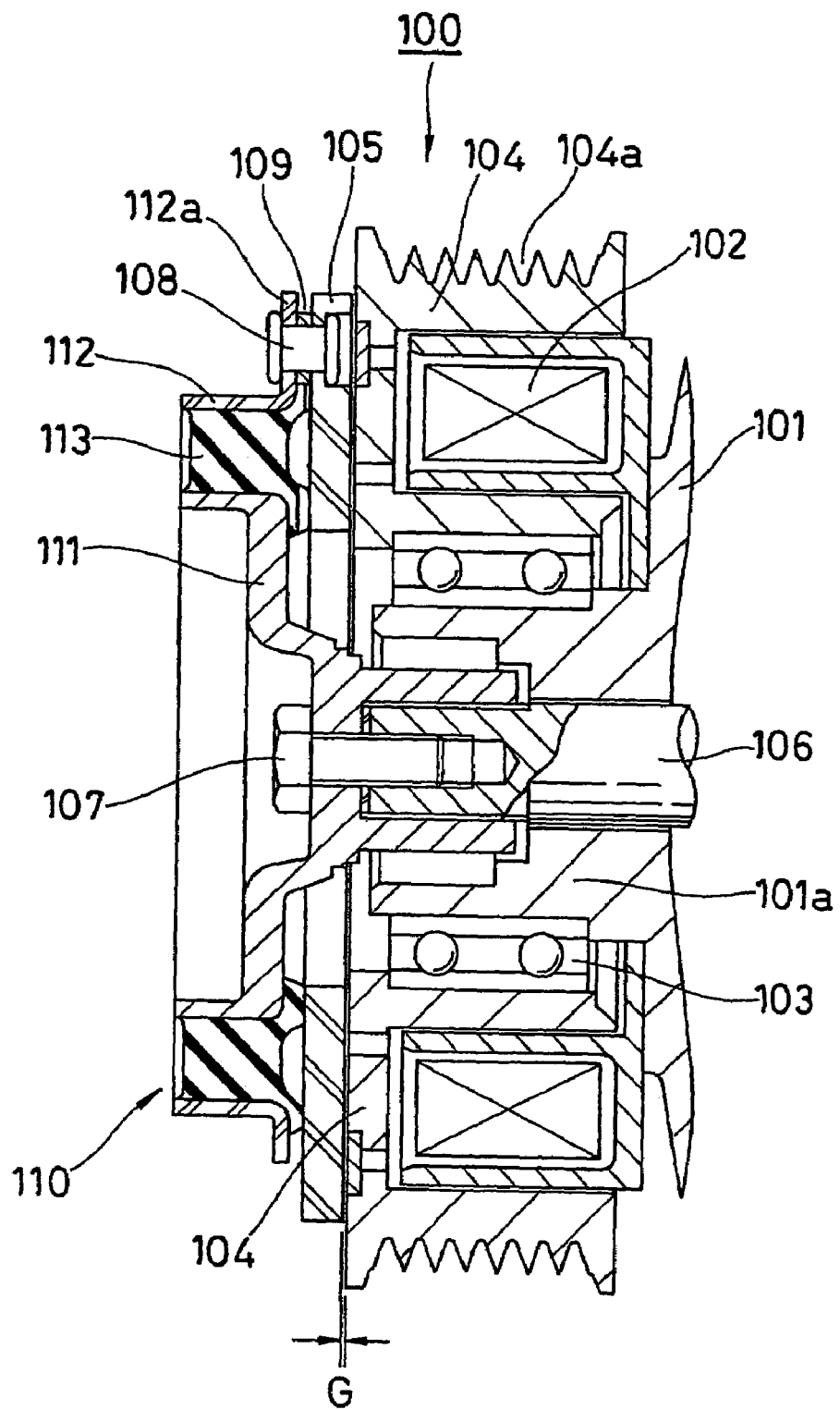
FIG. 8 is a cross sectional view showing an solenoid clutch using a coupling in accordance with the prior art by cutting along a plane passing through an axis of the solenoid clutch.

Next, FIG. 6 is a front view showing a preferable second embodiment of the solenoid clutch coupling in accordance with the present invention in an uninstalled state, and FIG. 7 is a cross sectional view showing by cutting along a line VII-VII' in FIG. 6.

The coupling 7 in accordance with the second embodiment is different from the first embodiment in a point that the sleeve portion 21 of the outer ring 20 is formed in a cylinder surface, the engagement protruding portions (the non-cylinder portions) 21a as shown in the previously explained FIG. 2 are not formed, and a plurality of front surface side stoppers 24 formed in the end portion in the front surface side of the sleeve portion 21 are engaged with a plurality of engagement projections 41 formed in an end portion in a front surface side of the reinforcing ring 40 vulcanized and adhered to the elastic body 30 in a buried state in a circumferential direction, and the other portions are basically structured in the same manner as that of the first embodiment.

In detail, the engagement projections 41 formed in the end portion in the front surface side of the reinforcing ring 40 correspond to the circumferential engagement portions described in the third aspect, and protrude from the elastic body 30 so as to hold the respective front surface side stoppers 24 formed in the sleeve portion 21 of the outer ring 20 from both sides in the circumferential direction by one set comprising two engagement portions 41, as shown in FIG. 7. Accordingly, the front surface side stoppers 24 formed in the sleeve portion 21 of the outer ring 20 have a function of preventing a slip in an axial direction of the elastic body 30 with respect to the outer ring 20 together with the back surface side stopper 23, in the same manner as the first embodiment, and has a function of preventing a slip in the axial direction of the elastic body 30 with respect to the outer ring 20 on the basis of the engagement with the engagement projections 41 existing in both sides in the circumferential direction.

In other words, in the case that the armature 5 in the previously explained FIG. 1 is attracted to the rotor 4 on the basis of the magnetic field of the exciting coil 2 so as to perform the clutch meet, the rotation torque input to the outer ring 20 from the rotor 4 via the armature 5 is transferred to the elastic body 30 integrally formed with the reinforcing ring 40 from the front surface side stoppers 24 of the outer ring 20 via the reinforcing ring 40 engaging with the front surface side stoppers 24 in the engagement projections 41. Accordingly, the slip in the circumferential direction is not caused between the sleeve portion 21 of the outer ring 20 and the elastic body 30 on the basis of the rapid input of the rotation torque at a time of the clutch meet.

Further, since the fit layer 32 brought into pressure contact with the inner peripheral surface of the sleeve portion 21 of the outer ring 20 is made of the rubber-type elastic material, and has the extremely low coefficient of thermal conductivity, the reinforcing ring 40 and the elastic body main body 31 are thermally insulated with respect to the outer ring 20. Accordingly, it is possible to effectively prevent the breakage of the adhered surface between the reinforcing ring 40 and the elastic body main body 31.

In this case, the rubber material of the outer peripheral portion of the fit layer 32 brought into pressure contact with the inner peripheral surface of the sleeve portion 21 of the outer ring 20 may be deteriorated due to the heat. However, since the transfer of the input torque does not depend on the slip torque between the fit layer 32 and the sleeve portion 21, but is executed via the engagement portion between the front surface side stoppers 24 of the outer ring 20 and the engagement projections 41 of the reinforcing ring 40 as mentioned above, it is possible to secure the torque transfer function.

INDUSTRIAL APPLICABILITY

In accordance with the solenoid clutch coupling on the basis of the first aspect of the present invention, the reinforcing ring is buried in the outer peripheral portion of the elastic body made of the rubber-type elastic material, and the fit layer formed in the outer peripheral side of the reinforcing ring is fitly attached to the inner peripheral surface of the outer ring in the armature side. Accordingly, since the friction heat generated at a time of the clutch meet is shut off by the fit layer, it is possible to prevent the connection breakage between the elastic body and the outer ring due to the friction heat between the armature and the rotor, and it is not necessary that the heat insulating spacer is interposed between the armature and the outer ring.

In accordance with the solenoid clutch coupling on the basis of the second aspect of the present invention, since the non-cylindrical surfaces engaging with the fit layer in the circumferential direction are formed in the inner peripheral surface of the outer ring, it is possible to securely prevent the slip in the circumferential direction between the outer ring and the elastic body at a time of transferring the torque, and it is possible to increase the torque transferring force.

In accordance with the solenoid clutch coupling on the basis of the third aspect of the present invention, since the circumferential engagement portions engaging with parts of the outer ring in the circumferential direction are formed in the reinforcing ring buried in the outer peripheral portion of the elastic body, it is possible to prevent the slip in the axial direction between the outer ring and the elastic body.

In accordance with the solenoid clutch coupling on the basis of the fourth aspect of the present invention, since the axial stoppers with respect to the outer peripheral portion of the elastic body are formed in the outer ring, it is possible to prevent the slip in the axial direction between the outer ring and the elastic body.

What is claimed is:

1. An solenoid clutch coupling comprising:
a hub attached to a rotation shaft;
an outer ring coupled to an armature coaxially arranged in an outer peripheral side of the hub and moved close to and apart from a rotor on the basis of an energization/deenergization of an exciting coil; and
an elastic body elastically coupling said hub and the outer ring and made of a rubber elastic material,
wherein a reinforcing ring is buried in an outer peripheral portion of said elastic body and fixedly attached at a location where the elastic body is coupling the outer ring by clamping, and a fit layer constituted by a part of the elastic body formed in an outer peripheral side of the reinforcing ring is fitly attached to an inner peripheral surface of said outer ring;

wherein the distance between the reinforcing ring and the hub is larger than the distance between the reinforcing ring and the outer ring.

2. The solenoid clutch coupling as claimed in claim 1, wherein non-cylindrical surfaces engaging with the fit layer in a circumferential direction are formed in an inner peripheral surface of the outer ring.

3. An solenoid clutch coupling comprising:

a hub attached to a rotation shaft;

an outer ring coupled to an armature coaxially arranged in an outer peripheral side of the hub and moved close to and apart from a rotor on the basis of an energization/deenergization of an exciting coil; and an elastic body elastically coupling said hub and the outer ring and made of a rubber elastic material, wherein a reinforcing ring is buried in an outer peripheral portion of said elastic body, and a fit layer constituted by a part of the elastic body formed in an outer peripheral side of the reinforcing ring is fitly attached to an inner peripheral surface of said outer ring; and wherein circumferential engagement portions engaging with parts of the outer ring in a circumferential direction are formed in the reinforcing ring.

4. An solenoid clutch coupling as claimed in claim 1, wherein axial stoppers with respect to an outer peripheral portion of the elastic body are formed in the outer ring.

* * * * *